(12) United States Patent
Takahashi et al.

(10) Patent No.: US 8,613,558 B2
(45) Date of Patent: Dec. 24, 2013

(54) PRELOAD DEVICE OF BALL BEARING AND MOTOR HAVING THE PRELOAD DEVICE

(75) Inventors: Yuuki Takahashi, Nagano (JP); Yuzuru Suzuki, Nagano (JP)

(73) Assignee: Minebea Co., Ltd., Nagano (JP)

( * ) Notice: Subject to any disclaimer, the term of this patent is extended or adjusted under 35 U.S.C. 154(b) by 133 days.

(21) Appl. No.: 13/219,978

(22) Filed: Aug. 29, 2011

(65) Prior Publication Data

US 2012/0051681 A1 Mar. 1, 2012

(30) Foreign Application Priority Data

Aug. 31, 2010 (JP) .................................. 2010-193642

(51) Int. Cl.
*F16C 33/66* (2006.01)
*F16C 43/00* (2006.01)
*F16F 1/12* (2006.01)
*F16M 13/00* (2006.01)

(52) U.S. Cl.
USPC ........... 384/518; 384/537; 267/174; 248/578; 248/594; 248/600

(58) Field of Classification Search
USPC .......... 384/517, 518, 537, 563, 583; 267/170, 267/171, 174, 179; 248/575, 578, 580, 594, 248/600
See application file for complete search history.

(56) References Cited

U.S. PATENT DOCUMENTS

| 4,655,616 | A | * | 4/1987 | Ducan | 384/446 |
| 4,672,250 | A | * | 6/1987 | Seitz | 310/90 |
| 4,719,352 | A | * | 1/1988 | Miyatake et al. | 250/351 |
| 4,727,762 | A | * | 3/1988 | Hayashi | 74/89.37 |
| 4,772,135 | A | * | 9/1988 | Griguscheit | 384/99 |
| 6,896,415 | B2 | * | 5/2005 | Ishiwada et al. | 384/517 |
| 6,971,801 | B2 | * | 12/2005 | Miyazaki et al. | 384/504 |

FOREIGN PATENT DOCUMENTS

JP          4-82425 U          7/1992

* cited by examiner

*Primary Examiner* — Marcus Charles
*Assistant Examiner* — Adam D Rogers
(74) *Attorney, Agent, or Firm* — Carrier Blackman & Associates, P.C.; Joseph P. Carrier; William D. Blackman (57) ABSTRACT

A constant preload device of a ball bearing is provided. The preload device includes an elastic member having a hollow shape with openings at both sides in an elastic direction, and two holders inserted into the openings at the both sides of the elastic member, respectively. Each holder includes a flange part configured to contact an end portion of the opening, into which the holder is inserted, to regulate an extension of the elastic member in the elastic direction, and a claw part configured to engage with the other holder to regulate separation from the other holder. The holders are engaged to each other by the claw parts such that the elastic member is exposed from the holders. When the preload device applies preload to the ball bearing, the ball bearing contacts the preload device only at an outer ring of the ball bearing.

8 Claims, 6 Drawing Sheets

PRELOAD DEVICE OF BALL BEARING AND MOTOR HAVING THE PRELOAD DEVICE

BACKGROUND OF THE INVENTION

1. Field of the Invention

The present invention relates to a preload device of a ball bearing by a coil spring and a motor having the preload device.

2. Description of the Related Art

When a ball bearing is used as a bearing of a rotational shaft of a motor and the like, if an internal clearance in the bearing exists, a play of a ball is large and stiffness of the bearing is weak. As a result, the rotational vibration of the shaft is increased. Therefore, a preload structure has been known which applies preload to the bearing so as to decrease the play of the ball.

For example, JP-UM-A-H4-82425 describes a preload structure where an outer ring is mounted to a rolling groove provided to a shaft via rolling elements, and preload is applied to the outer ring in an axial direction, thereby reducing the play of the rolling elements.

In such preload structure of applying the preload to the ball bearing, elastic force of a coil spring is generally used. However, in a preload structure where only the coil spring is provided around a shaft of a motor and the like, and the ball bearing is directly preloaded by an end surface of the coil spring, it is necessary to flatten the end surface of the coil spring so as to uniformly apply the preload. In addition, when assembling the rotational shaft and the ball bearing, it is difficult to perform the assembling because the ball bearing is pressed and thus returned due to the elastic force of the coil spring returning to its free length.

Accordingly, in the ball bearing device described in JP-UM-A-H4-82425, an inner cylinder, which accommodates therein a coil spring, is covered with an outer cylinder and an outer peripheral surface of the inner cylinder and an inner peripheral surface of the outer cylinder are configured to be slidable in an elastic direction of the coil spring, i.e., in an axial direction. In addition, after the coil spring is forcibly compressed by pressing the inner and outer cylinders from both sides, the outer and inner cylinders are locked by lock parts of the outer and inner cylinders and are assembled between bearings. Then, after the outer and inner cylinders are assembled between the bearings, by releasing the lock state, preload is applied to the bearings. Accordingly, since the end surfaces of the coil spring are not directly contacted to the bearings, it is not necessary to flatten the end surfaces. However, when the bearing device is provided in a cylinder, it is not possible to release the lock state, and therefore, the elastic force of the coil spring is still an obstacle in assembling the shaft and the bearing. Further, since the coil spring is enclosed in the inner and outer cylinders, it is not possible to recognize whether or not the coil spring is provided or a type of the coil spring at a later time, so that it is not possible to appropriately apply the preload.

SUMMARY OF THE INVENTION

The present invention has been made in view of the above circumstances, and it is an aspect of the present invention to provide a preload device of a ball bearing which allows a preload spring to be easily handled and appropriately applies preload to the ball bearing and a motor having the preload device.

According to an illustrative embodiment of the present invention, there is provided a constant preload device of a ball bearing, which comprises an elastic member having a hollow shape with openings at both sides in an elastic direction; and two holders which are inserted into the openings at the both sides of the elastic member, respectively. Each of the holders includes a flange part configured to contact an end portion of the opening, into which the holder is inserted, to regulate an extension of the elastic member in the elastic direction, a claw part configured to engage with the other holder which is inserted through the opposite opening to regulate separation from the other holder. The holders inserted from both sides of the elastic member are engaged to each other by the claw parts such that the elastic member is held between the holders to have a length which is shorter than a free length thereof and which is capable of applying a load required for a predetermined preload and such that the elastic member is exposed from the holders. When the preload device applies preload to the ball bearing, the ball bearing is contacted to the preload device only at an outer ring of the ball bearing.

According to another illustrative embodiment, there is provided a motor having the above preload device.

According to the above configuration, it is possible to provide a preload device of a ball bearing which allows a preload spring to be easily handled and appropriately applies preload to the ball bearing.

BRIEF DESCRIPTION OF THE DRAWINGS

In the accompanying drawings:

FIGS. 5A and 5B are side sectional views showing the preload device 100 shown in FIG. 1, in which a left half view is a side sectional view at a position of a central shaft, respectively, where FIG. 5A shows an engaged state of a claw part 104 and a claw part 105 and FIG. 5B shows a state in which preload is applied to a ball bearing;

FIGS. 7A and 7B show examples of a preload device different from FIG. 5, where FIG. 7A shows a case in which a thinner coil spring is used, and FIG. 7B shows a case in which a thicker coil spring is used.

DETAILED DESCRIPTION

Hereinafter, illustrative embodiments of the present invention will be described with reference to the drawings.

Figure 1:
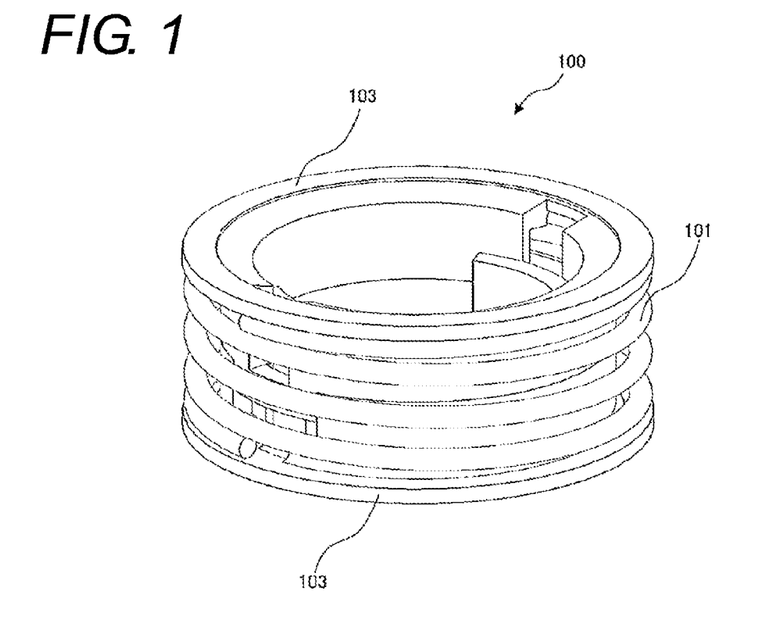
FIG. 1 is a perspective view showing a preload device that is used to apply preload to a ball bearing according to an illustrative embodiment of the present invention.

FIG. 1 is a perspective view showing a preload device that is used to apply preload to a ball bearing according to an illustrative embodiment of the present invention.

A preload device 100 includes a coil spring 101 that is an elastic member for preload and is held between upper and lower holders 103. The upper and lower holders 103 are engaged to each other, so that the coil spring 101 is held at an urging state.

In this illustrative embodiment, the coil spring 101 is used as an elastic member for preload. However, the present invention is not limited thereto. For example, a cylindrical rubber member may be used as an elastic member for preload.

Figure 2:
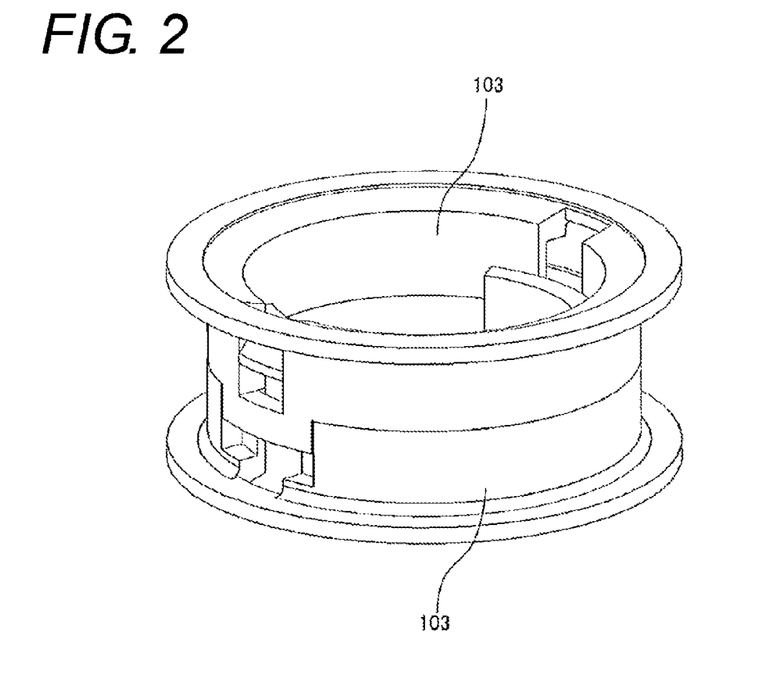
FIG. 2 is a perspective view in which a coil spring 101 is removed from the preload device 100 shown in FIG. 1.
Figure 3:
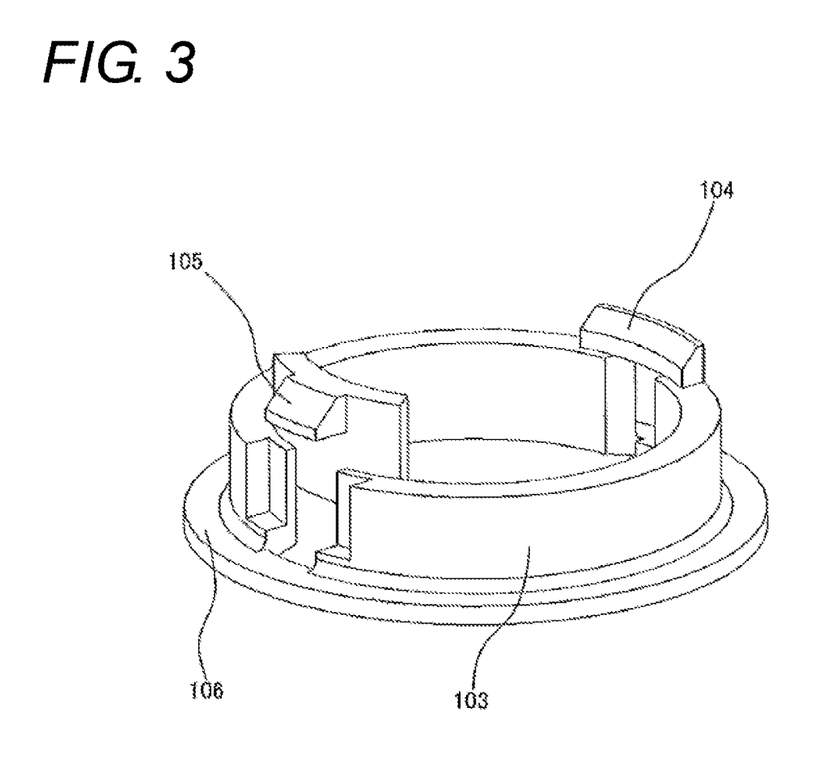
FIG. 3 is a perspective view showing one holder 103.

FIG. 2 is a perspective view in which the coil spring 101 is removed from the preload device 100 shown in FIG. 1. FIG. 3 is a perspective view showing one of the holders 103.

In this illustrative embodiment, two holders (upper and lower holders) 103 having the same shape are provided and the coil spring 101 is held between the upper and lower holders 103.

Each of the holders 103 has claw parts 104, 105 and is engaged with the opposing holder 103 by the claw parts 104, 105. Each holder 103 has an annular flange part 106 configured to press an end portion of the coil spring 101 in the elastic direction, thereby regulating extension of the coils spring 101 and holding the coil spring 101 between the holder 103 and the opposing holder 103.

The positional relationship between the upper holder 103 and the lower holder 103 in a circumferential direction is set such that the claw part 104 of the upper holder 103 is fitted with the claw part 105 of the lower holder 103 and the claw part 105 of the upper holder 103 is fitted with the claw part 104 of the lower holder 103.

In this illustrative embodiment, the claw parts are provided at two positions. However, the claw parts may be provided at three or more positions. In addition, separately from the claw parts, lock parts may be provided to reduce the load in a circumferential direction, which is generated when the coil spring 101 expands and contracts the upper holder 103 and the lower holder 103.

Figure 4:
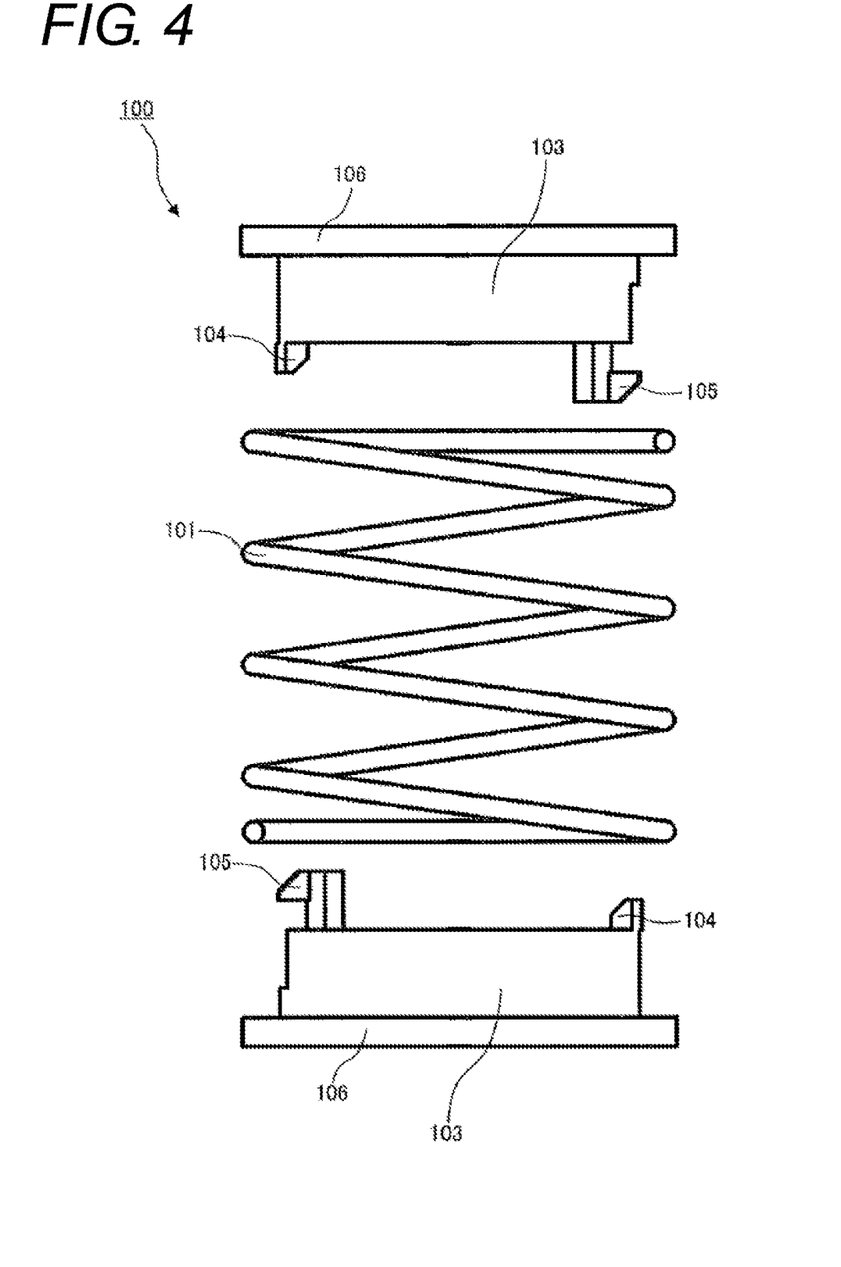
FIG. 4 is an exploded side view showing upper and lower holders 103 and the coil spring 101 to be held therebetween.

FIG. 4 is an exploded side view showing the upper and lower holders 103 and the coil spring 101 to be held therebetween.

The coil spring 101 has a hollow shape with openings at both ends in the elastic direction (axial direction). From each of the ends of the coil spring 101, a side of each of the upper and lower holders 103 opposite to the flange part 106 is inserted into the coil spring 101. The claw part 104 of one holder 103 is engaged with the claw part 105 of the other holder 103 and the claw part 105 of the one holder 103 is engaged with the claw part 104 of the other holder 103.

Figure 5A:
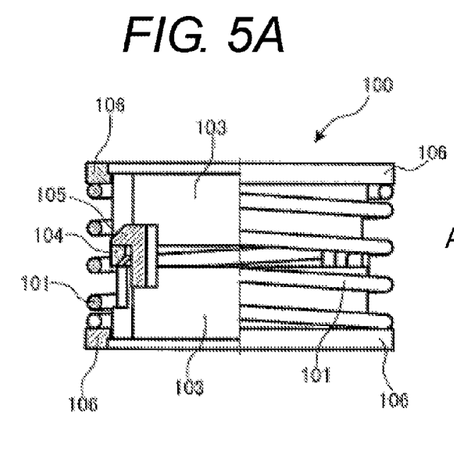
Figure 5B:
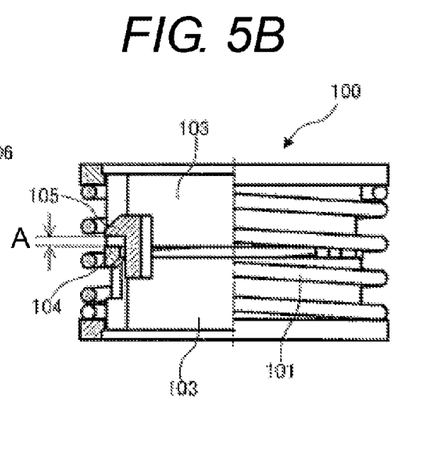

FIGS. 5A and 5B are side sectional views showing the preload device 100 shown in FIG. 1, in which a left half view is a side sectional view at a position of a central shaft, respectively, where FIG. 5A shows an engaged state of the claw part 104 and the claw part 105 and FIG. 5B shows a state in which preload is applied to a ball bearing (not shown).

When the claw part 104 of the one holder 103 is engaged with the claw part 105 of the other holder 103 and the claw part 105 of the one holder 103 is engaged with the claw part 104 of the other holder 103, the claw parts 104 and the claw parts 105 of the holders 103 are contacted to each other by the elastic force of the coil spring 101, so that the one holder 103 and the other holder 103 are locked and thus regulated to be not further spaced away. In this state or first position, the coil spring 101 is compressed such that it is shortened, compared to the free length, and is thus under the urging state (refer to FIG. 5A).

As shown in FIG. 5B, when the preload device 100 is further compressed from the outer side of the coil spring 101 in the elastic direction, the distance between the flange part 106 of the one holder 103 and the flange part 106 of the other holder 103 is shortened, so that the contact of the claw part 104 and the claw part 105 is released and a distance A is thus formed therebetween. In this state or second position, the ball bearing (not shown) is preloaded by the urging force of the coil spring 101 due to the distance A and the flange parts 106 can be closer to each other for easy attachment of the ball bearing.

The preload device 100 of this illustrative embodiment is pressed by the two holders 103, and therefore, when compressing the coil spring 101, it is possible to easily control the coil spring 101 to be not deviated or shaken. Hence, it is possible to easily provide the preload device so as to apply the preload to the ball bearing.

In addition, according to the preload device 100 of this illustrative embodiment, the holders 103 are respectively inserted into the openings at both sides of the hollow coil spring 101 having the openings at both sides in the elastic direction and the coil spring 101 is not hidden by the holders 103. Therefore, it is possible to visually recognize the coil spring 101 from the outer periphery direction. Accordingly, it is possible to easily recognize whether or not the coil spring 101 is provided and a type of the coil spring 101 at a later time.

Figure 6:
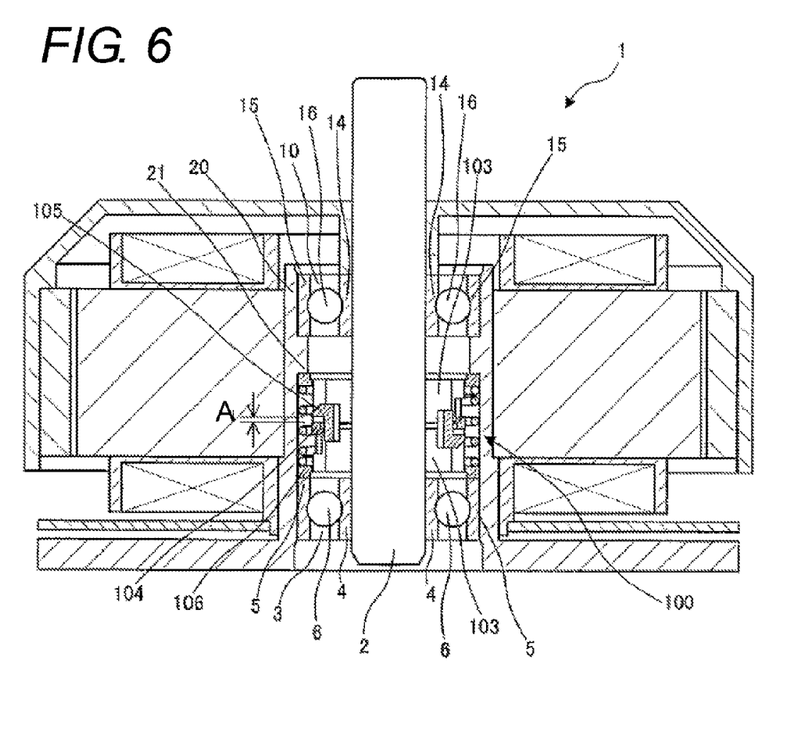
FIG. 6 is a side sectional view showing a motor having the preload device 100 shown in FIG. 1 provided therein.

FIG. 6 is a side sectional view showing a motor having the preload device 100 shown in FIG. 1 provided therein.

A motor 1 rotatably supports a rotatable shaft 2 via ball bearings 3, 10. In this illustrative embodiment, the preload is applied to the ball bearings 3, 10 by the preload device 100.

The ball bearings 3, 10 are provided on an inner peripheral surface of a bearing liner 20. The preload device 100 is interposed between the ball bearing 3 and a convex part 21 which protrudes toward an inner side from the inner peripheral surface of the bearing liner 20 to have a smaller diameter.

The ball bearing 10 includes a plurality of balls 16 between an inner ring 14 and an outer ring 15. The inner ring 14 and the outer ring 15 are configured to be relatively rotatable via the balls 16. The rotatable shaft 2 is fixed on an inner peripheral surface of the inner ring 14 by a press-fitting or the like, and an outer peripheral surface of the outer ring 15 is provided on the inner peripheral surface of the bearing liner 20. A lower end surface of the outer ring 15 is contacted to an upper surface of the convex part 21 of the inner peripheral surface of the bearing liner 20.

The ball bearing 3 includes a plurality of balls 6 between an inner ring 4 and an outer ring 5. The inner ring 4 and the outer ring 5 are configured to be relatively rotatable via the balls 6. The rotatable shaft 2 is fixed on an inner peripheral surface of the inner ring 4 by a press-fitting or the like, and an outer peripheral surface of the outer ring 5 is provided to the inner peripheral surface of the bearing liner 20 with a clearance.

The upper surface of the upper flange part 106 of the preload device 100 is contacted to a lower surface of the convex part 21 of the inner peripheral surface of the bearing liner 20 and the lower surface of the lower flange part 106 of the preload device 100 is contacted only to the outer ring 5 of the ball bearing 3. The outer ring 5 of the ball bearing 3 is applied with the load by the preload device 100 in a downward direction. The load applied to the outer ring 5 of the ball bearing 3 is transmitted to the inner ring 14, the balls 16 and the outer ring 15 of the ball bearing 10 via the balls 6, the inner ring 4 and the rotatable shaft 2. Thereby, it is possible to appropriately apply the preload to the ball bearings 3, 10.

Figure 7A:
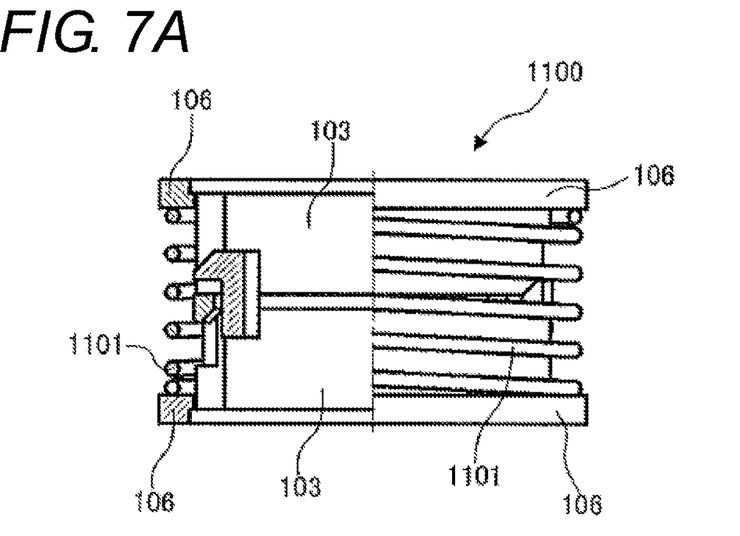
Figure 7B:
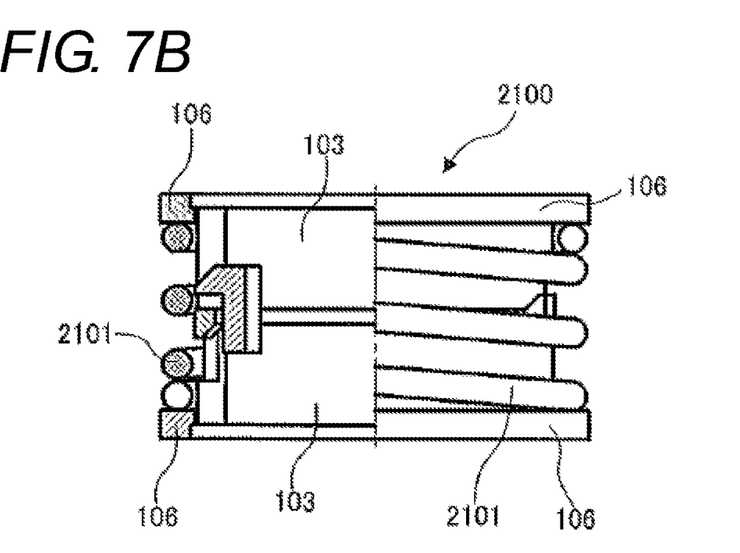

FIGS. 7A and 7B show examples of a preload device different from FIG. 5, where FIG. 7A shows a case in which a thinner coil spring is used and FIG. 7B shows a case in which a thicker coil spring is used. In FIGS. 7A and 7B, the same constitutional members as those of FIG. 5 are indicated with the same reference numerals and the descriptions thereof will be omitted.

In FIG. 7A, a preload device 1100 uses a coil spring 1101, instead of the coil spring 101. The coil spring 1101 is thinner than the coil spring 101 and can obtain desired preload force.

In FIG. 7B, a preload device 2100 uses a coil spring 2101, instead of the coil spring 101. The coil spring 2101 is thicker than the coil spring 101 and can obtain desired preload force.

In this illustrative embodiment, in each of FIGS. 5B, 7A and 7B, it is possible to recognize the coil spring with naked eyes or automatically recognize the coil spring with camera photographing and the like, for example, and to easily distinguish whether a coil spring having a thickness enough to secure the desired preload force is used.

Figure 8:
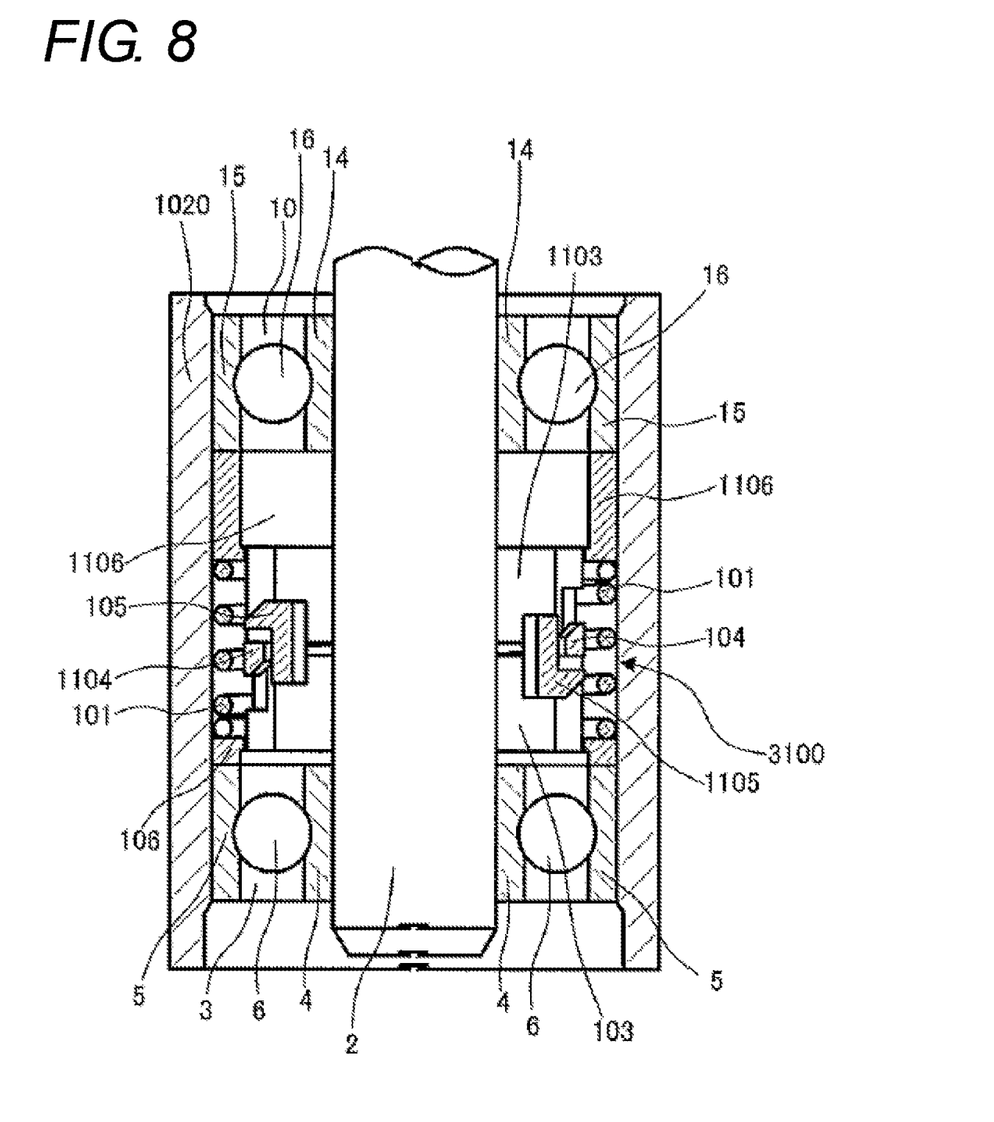
FIG. 8 shows an example of a preload device different from FIG. 1, and is a side sectional view of a motor to which the preload device is provided so as to apply preload to the ball bearing.

FIG. 8 shows an example of a preload device different from FIG. 1, and is a side sectional view of a motor to which the preload device is provided so as to apply preload to the ball bearing. In FIG. 8, the same constitutional members as those of FIG. 6 are indicated with the same reference numerals and the descriptions thereof will be omitted.

In this illustrative embodiment, the rotatable shaft 2 is rotatably held via the ball bearings 3, 10. In this illustrative embodiment, a preload device 3100 applies the preload to the ball bearings 3, 10.

In the preload device 100 shown in FIG. 6, the two holders 103 are provided and the coil spring 101 is interposed between the two holders 103. However, in the preload device 3100 shown in FIG. 8, the upper holder of FIG. 8 is configured by a holder 1103 different from the holder 103.

The holder 1103 has an annular flange part 1106 and the end portion of the coil spring 101 in the elastic direction is pressed by the flange part 1106, so that the coil spring 101 is held between the holder 1103 and the opposing holder 103.

The rotational relationship between the upper holder 1103 and the lower holder 103 in the circumferential direction is set such that a claw part 1104 of the upper holder 1103 is fitted with the claw part 105 of the lower holder 103 and a claw part 1105 of the upper holder 1103 is fitted with the claw part 104 of the lower holder 103.

The ball bearings 3, 10 are provided on an inner peripheral surface of a hollow cylindrical bearing liner 1020.

The holder 1103 of the preload device 3100 is fittingly fixed by a press-fitting such that an outer peripheral surface of the flange part 1106 of the holder 1103 is fixed on the inner peripheral surface of the bearing liner 1020. The flange part 106 of the holder 103 applies the load to the outer ring 5 of the ball bearing 3.

The lower end surface of the outer ring 15 of the ball bearing 10 is contacted to an upper end surface of the flange part 1106 of the holder 1103 of the preload device 3100.

In the illustrative embodiment shown in FIG. 6, in order to set the axial position of the ball bearing 10 or the preload device 100 in the inner diameter cylinder part of the bearing liner 20, a part of the inner diameter cylinder part should be reduced in a diameter thereof such that the convex part 21 serving as the support part of the ball bearing 10 or the preload device 100 is provided. In this case, a relatively high processing technology is required so as to secure a coaxiality of ball bearing accommodating parts of the bearing liner 20, which accommodate the upper and lower ball bearings 3, 10.

In the illustrative embodiment shown in FIG. 8, when a part of the inner diameter cylinder part of the bearing liner 1020 is configured such that the flange part 1106 of the holder 1103 is fittingly fixed therein by a press-fitting, it is possible to easily process the coaxiality of the ball bearing accommodating parts of the bearing liner 1020, which accommodate the upper and lower ball bearings 3, 10, with high precision.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A constant preload device of a ball bearing, the preload device comprising:
    an elastic member having a hollow shape with openings at both sides in an elastic direction; and
    two holders which are inserted into the openings at the both sides of the elastic member, respectively,
    wherein each of the holders includes:
        a flange part configured to contact an end portion of the opening, into which the holder is inserted, to regulate an extension of the elastic member in the elastic direction thereof; and
        a claw part configured to engage with the other holder such that the holders are slidable with respect to each other between a first position and a second position along the elastic direction,
    wherein in the first position the claw parts of the respective holders contact each other to regulate separation therebetween in the elastic direction such that the elastic member is held between the holders to have a first length which is shorter than a free length of the elastic member, and in the second position the claw parts of the respective holders are separated by a distance in the elastic direction such that the elastic member is held between the holders to have a second length which is shorter than the first length, and
    wherein when the preload device applies preload to the ball bearing, the ball bearing is contacted to the preload device only at an outer ring of the ball bearing.

2. The constant preload device according to claim 1, wherein the ball bearing and the preload device are provided on an inner peripheral surface of a cylindrical bearing liner and an outer peripheral surface of one of the holders is fittingly fixed on the inner peripheral surface of the bearing liner.

3. A motor having the preload device according to claim 1.

4. The constant preload device according to claim 1, wherein the elastic member is outwardly exposed from the holders so as to be visible from an outer peripheral direction thereof.

5. The constant preload device according to claim 1, wherein the preload device applies preload to the ball bearing when the holders are in the second position.

6. The constant preload device according to claim 1, wherein the ball bearing and the preload device are provided on an inner peripheral surface of a substantially cylindrical bearing liner, the bearing liner has a convex part provided on an inner peripheral surface thereof, the convex part has a smaller inner diameter than that of the inner peripheral surface, one of the holders contacts the convex portion and the other holder contacts the outer ring of the ball bearing when the holders are in the second position.

7. The constant preload device according to claim 1, wherein the claw part of one of the holders projects a larger distance away from the flange of the one holder than the claw part of the other holder projects away from the flange of the other holder, and in the first position and the second position a portion of the claw part of the one holder is disposed between the flange and the claw part of the other holder.

8. The constant preload device according to claim 1, wherein each of the holders includes more than one said claw part disposed in spaced relation to each other, and the holders are rotatable relative to each other for selectively contacting their respective claw parts together.

* * * * *